(12) United States Patent
Duyvesteyn et al.

(10) Patent No.: US 8,435,402 B2
(45) Date of Patent: May 7, 2013

(54) NOZZLE REACTOR AND METHOD OF USE

(75) Inventors: Willem P. C. Duyvesteyn, Reno, NV (US); Jose Armando Salazar, Reno, NV (US)

(73) Assignee: Marathon Canadian Oil Sands Holding Limited, Calgary, AB (CA)

( * ) Notice: Subject to any disclaimer, the term of this patent is extended or adjusted under 35 U.S.C. 154(b) by 499 days.

(21) Appl. No.: 12/749,068

(22) Filed: Mar. 29, 2010

(65) Prior Publication Data

US 2011/0233114 A1   Sep. 29, 2011

(51) Int. Cl.
*C10G 9/26* (2006.01)

(52) U.S. Cl.
USPC .............. 208/125; 208/309; 208/106; 208/46

(58) Field of Classification Search ............ 208/106
See application file for complete search history.

(56) References Cited

U.S. PATENT DOCUMENTS

| | | |
|---|---|---|
| 2,658,861 A | 11/1953 | Pevere et al. |
| 2,871,180 A | 1/1959 | Lowman et al. |
| 3,079,327 A | 2/1963 | Keith et al. |
| 3,131,141 A | 4/1964 | West |
| 3,389,075 A | 6/1968 | Addison |
| 3,527,692 A | 9/1970 | Titus |
| 3,565,593 A | 2/1971 | Moore et al. |
| 3,565,594 A | 2/1971 | Moore |
| 3,565,968 A | 2/1971 | Moore |
| 3,692,859 A | 9/1972 | Cottle |
| 3,779,902 A | 12/1973 | Mitchell et al. |
| 3,951,778 A | 4/1976 | Willard, Sr. |
| 4,035,282 A | 7/1977 | Stuchberry et al. |
| 4,046,668 A | 9/1977 | Farcasiu et al. |
| 4,120,777 A | 10/1978 | Globus |
| 4,139,450 A | 2/1979 | Hanson et al. |
| 4,308,133 A | 12/1981 | Meyer |
| 4,320,091 A | 3/1982 | Irvin |
| 4,347,118 A | 8/1982 | Funk et al. |
| 4,427,537 A | 1/1984 | Dean et al. |
| 4,490,259 A | 12/1984 | Coffing |

(Continued)

FOREIGN PATENT DOCUMENTS

| | | |
|---|---|---|
| CA | 2346181 | 4/2001 |
| CA | 2224615 | 7/2001 |

(Continued)

OTHER PUBLICATIONS

International Search Report, PCT/US2011/022206, Oct. 20, 2011 (3 pp.).

(Continued)

*Primary Examiner* — Randy Boyer
*Assistant Examiner* — Juan Valencia
(74) *Attorney, Agent, or Firm* — Holland & Hart LLP

(57) ABSTRACT

A method of cracking hydrocarbon material in a nozzle reactor. The method includes a step of providing a nozzle reactor, a step of injecting a stream of cracking material into the reactor body of the nozzle reactor, and a step of injecting hydrocarbon material into the reactor body of the nozzle reactor, wherein the cracking material is methanol, ethanol, ethane, propane, biodiesel, carbon monoxide, nitrogen, or combinations thereof. The cracking material can also include steam. The hydrocarbon material can be injected into the reactor body at a direction transverse to the direction the cracking material is injected into the reactor body.

25 Claims, 3 Drawing Sheets

U.S. PATENT DOCUMENTS

| | | | |
|---|---|---|---|
| 4,589,980 A | 5/1986 | Keys |
| 4,596,651 A | 6/1986 | Wolff et al. |
| 4,612,113 A | 9/1986 | Kallionen |
| 4,678,561 A | 7/1987 | Keys |
| 4,678,562 A | 7/1987 | Keys |
| 4,724,272 A | 2/1988 | Raniere et al. |
| 4,744,890 A | 5/1988 | Miller et al. |
| 4,859,317 A | 8/1989 | Shelfantook et al. |
| 4,900,454 A | 2/1990 | Hedlund et al. |
| 5,044,552 A | 9/1991 | Becker et al. |
| 5,108,583 A | 4/1992 | Keon |
| 5,143,598 A | 9/1992 | Graham et al. |
| 5,176,802 A | 1/1993 | Duyvesteyn et al. |
| 5,188,805 A | 2/1993 | Sabottke |
| 5,223,148 A | 6/1993 | Tipman et al. |
| 5,236,577 A | 8/1993 | Tipman et al. |
| 5,254,325 A | 10/1993 | Yamasaki et al. |
| 5,328,591 A | 7/1994 | Raterman |
| 5,389,274 A | 2/1995 | Fernandez |
| 5,443,158 A | 8/1995 | McKenny et al. |
| 5,464,503 A | 11/1995 | Avetisian et al. |
| 5,485,883 A | 1/1996 | Rippetoe et al. |
| 5,538,081 A | 7/1996 | Rippetoe et al. |
| 5,554,301 A | 9/1996 | Rippetoe et al. |
| 5,565,090 A | 10/1996 | Gosling et al. |
| 5,624,642 A | 4/1997 | Devanathan et al. |
| 5,626,743 A | 5/1997 | Humphreys |
| 5,670,056 A | 9/1997 | Yoon et al. |
| 5,673,859 A | 10/1997 | Haruch |
| 5,702,612 A | 12/1997 | Wang |
| 5,705,722 A | 1/1998 | Monnier et al. |
| 5,795,466 A | 8/1998 | Kelebek et al. |
| 5,798,137 A | 8/1998 | Lord et al. |
| 5,849,201 A | 12/1998 | Bradley |
| 5,876,592 A | 3/1999 | Tipman et al. |
| 5,896,435 A | 4/1999 | Gautier et al. |
| 5,961,786 A | 10/1999 | Freel et al. |
| 5,968,349 A | 10/1999 | Duyvesteyn et al. |
| 6,007,709 A | 12/1999 | Duyvesteyn et al. |
| 6,036,849 A | 3/2000 | Rippetoe et al. |
| 6,042,717 A | 3/2000 | Radcliffe et al. |
| 6,074,558 A | 6/2000 | Duyvesteyn et al. |
| 6,106,787 A | 8/2000 | Rippetoe |
| 6,214,213 B1 | 4/2001 | Tipman et al. |
| 6,320,148 B1 | 11/2001 | Yoon et al. |
| 6,352,639 B2 | 3/2002 | Ito et al. |
| 6,427,843 B1 | 8/2002 | Clark |
| 6,589,417 B2 | 7/2003 | Taciuk et al. |
| 6,667,348 B2 | 12/2003 | Chang et al. |
| 6,793,079 B2 | 9/2004 | Khan et al. |
| 6,821,500 B2 | 11/2004 | Fincke |
| 6,827,786 B2 | 12/2004 | Lord |
| 6,835,360 B2 | 12/2004 | Warren |
| 6,855,838 B2 | 2/2005 | Haas et al. |
| 6,871,743 B2 | 3/2005 | Yoon et al. |
| 6,887,283 B1 | 5/2005 | Ginosar et al. |
| 6,906,164 B2 | 6/2005 | DeBruin |
| 6,916,964 B2 | 7/2005 | Gobbel et al. |
| 6,936,227 B1 | 8/2005 | De Souza et al. |
| 6,989,091 B2 | 1/2006 | Jorgensen |
| 7,008,528 B2 | 3/2006 | Mitchell et al. |
| 7,011,749 B2 | 3/2006 | Hayes et al. |
| 7,018,435 B1 | 3/2006 | Wentinck |
| 7,195,747 B2 | 3/2007 | Vanden Bussche et al. |
| 7,381,320 B2 | 6/2008 | Iqbal et al. |
| 7,384,557 B2 | 6/2008 | Phillips et al. |
| 7,585,407 B2 | 9/2009 | Duyvesteyn |
| 7,618,597 B2 | 11/2009 | Duyvesteyn et al. |
| 7,811,444 B2 | 10/2010 | Duyvesteyn et al. |
| 7,824,453 B2 | 11/2010 | Duyvesteyn |
| 7,888,542 B2 | 2/2011 | Koivasalmi et al. |
| 7,909,989 B2 | 3/2011 | Duyvesteyn et al. |
| 7,927,565 B2 | 4/2011 | Duyvesteyn et al. |
| 7,988,847 B2 | 8/2011 | Duyvesteyn et al. |
| 2002/0035892 A1 | 3/2002 | Allemand et al. |
| 2002/0081250 A1 | 6/2002 | Lord |
| 2002/0151604 A1 | 10/2002 | Detering et al. |
| 2002/0162518 A1 | 11/2002 | Dumaz et al. |
| 2004/0065589 A1 | 4/2004 | Jorgensen |
| 2005/0070218 A1 | 3/2005 | Phillips et al. |
| 2006/0144760 A1* | 7/2006 | Duyvesteyn et al. ......... 208/128 |
| 2007/0170095 A1 | 7/2007 | Freel et al. |
| 2008/0156702 A1 | 7/2008 | Duyvesteyn |
| 2008/0210602 A1 | 9/2008 | Duyvesteyn |
| 2008/0242875 A1 | 10/2008 | Hong et al. |
| 2009/0145809 A1 | 6/2009 | Ledbetter et al. |
| 2009/0294332 A1 | 12/2009 | Ryu |
| 2010/0264062 A1 | 10/2010 | Duyvesteyn |
| 2011/0017642 A1 | 1/2011 | Duyvesteyn |
| 2011/0084000 A1 | 4/2011 | Duyvesteyn et al. |
| 2011/0180454 A1 | 7/2011 | Duyvesteyn |
| 2011/0233114 A1 | 9/2011 | Duyvesteyn et al. |
| 2011/0308995 A1 | 12/2011 | Salazar-Guillen et al. |
| 2012/0101014 A1 | 4/2012 | Salazar-Guillen et al. |
| 2012/0267286 A1 | 10/2012 | Salazar-Guillen et al. |

FOREIGN PATENT DOCUMENTS

| | | |
|---|---|---|
| JP | 2005307104 | 11/2005 |
| WO | WO 2007/102819 | 9/2007 |
| WO | WO2008/134296 | * 11/2008 |

OTHER PUBLICATIONS

U.S. Appl. No. 13/292,747, filed Nov. 9, 2011, Heavy Hydrocarbon Reactor.

U.S. Appl. No. 12/911,409, filed Oct. 25, 2010, Method for Making Biofuels and Biolubricants.

U.S. Appl. No. 12/816,844, filed Jun. 16, 2010, Dual Reactor for Better Conversion of Heavy Hydrocarbons.

U.S. Appl. No. 12/749,068, filed Mar. 29, 2010, Nozzle Reactor and Method of Use.

U.S. Appl. No. 12/695,885, filed Jan. 28, 2010, Methods for Preparing Solid Hydrocarbons for Cracking.

Hong et al., "A Polar-Nonpolar, Acetic Acid/Heptane, Solvent Medium for Degradation of Pyrene by Ozone," Ind. Eng. Chem. Res. 43:7710-7715, 2004 (6 pp.).

International Search Report and Written Opinion, PCT/US2006/08263, Oct. 23, 2006 (5 pp.).

International Search Report and Written Opinion, PCT/US2005/36728, Aug. 8, 2005 (8 pp.).

International Search Report, PCT/US2010/31260, Jun. 9, 2010 (3 pp.).

International Search Report and Written Opinion, PCT/US2010/42327, Sep. 1, 2010 (9 pp.).

International Search Report, PCT/US2010/043093, Sep. 13, 2010 (3 pp.).

Penberthy Houdaille, "Jet Pump Technical Data—pumping liquids" pp. 1-11 (1982).

International Search Report for PCT/US2005/034092, filed Jul. 26, 2007, 2 pages, date written May 20, 2007.

Written Opinion for PCT/US2005/34092, filed Jul. 26, 2007, 7 pages, date written May 20, 2007.

International Search Report, PCT/US2012/033013, Oct. 31, 2012 (5 pp.).

U.S. Appl. No. 13/666,108, filed Nov. 1, 2012, Systems and Methods for Integrating Bitumen Extraction with Bitumen Upgrading.

U.S. Appl. No. 13/662,939, filed Oct. 29, 2012, Nozzle Reactor Systems and Methods of Use.

U.S. Appl. No. 13/652,132, filed Oct. 15, 2012, Methods and Systems for Upgrading Hydrocarbon.

U.S. Appl. No. 13/589,927, filed Aug. 20, 2012, Upgrading Hydrocarbon Material on Offshore Platforms.

U.S. Appl. No. 13/532,453, filed Jun. 25, 2012, Methods and Systems for Upgrading Hydrocarbon Residuum.

U.S. Appl. No. 13/227,470, filed Sep. 7, 2011, Nozzle Reactor and Method of Use.

International Search Report, PCT/US2011/057585, May 30, 2012 (3 pp.).

Axelsson, H. et al., Centrifuges, Sedimentation, pp. 1-6, Jul. 15, 2006 (6 pp.).

Schneider, D. et al., Deep Cut Vacuum Tower Incentives for Various Crudes, Stratus Engineering, Inc., pp. 1-21, Mar. 1997 (21 pp.).

* cited by examiner

NOZZLE REACTOR AND METHOD OF USE

BACKGROUND

Some nozzle reactors operate to cause interaction between materials and achieve alteration of the mechanical or chemical composition of one or more of the materials. Such interaction and alteration typically occurs by injecting the materials into a reactor chamber in the nozzle reactor. The manner in which the materials are injected into the reactor chamber and the configuration of the various components of the nozzle reactor can both contribute to how the materials interact and what types of alterations are achieved.

Examples of nozzle reactors for altering the mechanical or chemical composition of materials injected therein are disclosed in U.S. Pat. No. 6,989,091. Some of the nozzle reactors discussed in the '091 patent have two steam injectors and a central feed stock injector, each of which includes a discharge end feeding into a central reactor tube. The two steam injectors are disposed (i) laterally separated from opposing sides of the central feed stock injector and (ii) at an acute angle to the axis of the central feed stock injector. The steam injectors are thus disposed for injection of material into the central reactor tube in the direction of travel of material feed stock injected into the central reactor tube by the central feed stock injector. The central feed stock injector is coaxial with the central reactor tube and has a generally straight-through bore.

As explained in the '091 patent, superheated steam is injected through the two laterally opposed steam injectors into the interior of central reactor tube in order to impact a pre-heated, centrally-located feed stream of certain types of heavy hydrocarbon simultaneously injected into the interior of the central reactor tube via the central feed stock injector. The '091 patent states that the object of the disclosed nozzle reactor is to crack the feed stream into lighter hydrocarbons through the impact of the steam feeds with the heavy hydrocarbon feed within the reactor tube. According to the '091 patent, the types of heavy hydrocarbons processed with the disclosed nozzle reactor are crude oil, atmospheric residue, and heavy distillates. With the nozzle reactor of the '091 patent, a central oil feed stock jet intersects the steam jets at some distance from the ejection of these jets from their respective injectors.

The reliance on steam in order to utilize nozzle reactors disclosed in the '091 patent and crack heavy hydrocarbons can lead to several shortcomings. A first shortcoming arises from the method being dependent on having a large source of high quality water available for creating steam (or superheated steam). Additionally, the method requires heating apparatus to convert water into steam and energy to run the heating apparatus. Still another disadvantage in requiring steam as a cracking material in a nozzle reactor system includes the difficulty associated with the separation of the reactor vapor phase into condensed steam (i.e., water) and small quantities of low carbon number hydrocarbons, such as methane, ethane, propane, and butane, or diluted organic compounds such as alcohols and mercaptans.

SUMMARY

Disclosed below are representative embodiments that are not intended to be limiting in any way. Instead, the present disclosure is directed toward features, aspects, and equivalents of the embodiments of the method and systems described below. The disclosed features and aspects of the embodiments can be used alone or in various combinations and sub-combinations with one another.

In some embodiments, a method of cracking hydrocarbon material in a nozzle reactor is described. The method includes providing a nozzle reactor, injecting a stream of cracking material into the nozzle reactor, and injecting hydrocarbon material into the nozzle reactor. The cracking material is entirely or almost entirely selected from methanol, ethanol, ethane, propane, nitrogen, biodiesel, carbon monoxide, or combinations thereof. The use of these cracking materials can provide several advantages as compared to when steam is used as a cracking material. Firstly, the use of these cracking materials can eliminate the logistical and economical problems often associated with relying on water as a cracking material. Secondly, use of these cracking materials can increase the amount of energy provided through the nozzle reactor per kg of cracking fluid as compared to when steam is used as the cracking material. The additional energy supplied to the nozzle reactor can result in improved cracking of hydrocarbon material. Thirdly, use of these cracking materials can greatly reduce the energy required for cooling. Finally, use of some of these cracking materials can potentially lead to an increase in hydrogen transfer. More specifically, the transfer of hydrogen rich free radicals to hydrocarbon molecules can be facilitated by use of some of the above-mentioned cracking materials.

In some embodiments, the cracking material is a combination of steam and a material selected from methanol, ethanol, ethane, propane, nitrogen, biodiesel, carbon monoxide, or combinations therefore. The use of these cracking material in conjunction with steam can reduce the need for water in the process and thereby mitigate the problems associated with using water as a cracking material. Additionally, the other advantages recognized above may still be achieved when using mixtures of the specifically recited cracking materials and stream.

In some embodiments, the method includes injecting a stream of cracking material through a cracking material injector into a reaction chamber and injecting hydrocarbon material into the reaction chamber adjacent to the cracking material injector and transverse to the stream of cracking material entering the reaction chamber from the cracking material injector.

The foregoing and other features and advantages of the present application will become apparent from the following detailed description, which proceeds with reference to the accompanying figures. It is thus to be understood that the scope of the invention is to be determined by the claims as issued and not by whether a claim includes any or all features or advantages recited in this Brief Summary or addresses any issue identified in the Background

BRIEF DESCRIPTION OF THE DRAWINGS

The preferred and other embodiments are disclosed in association with the accompanying drawings in which.

DETAILED DESCRIPTION

Figure 1:
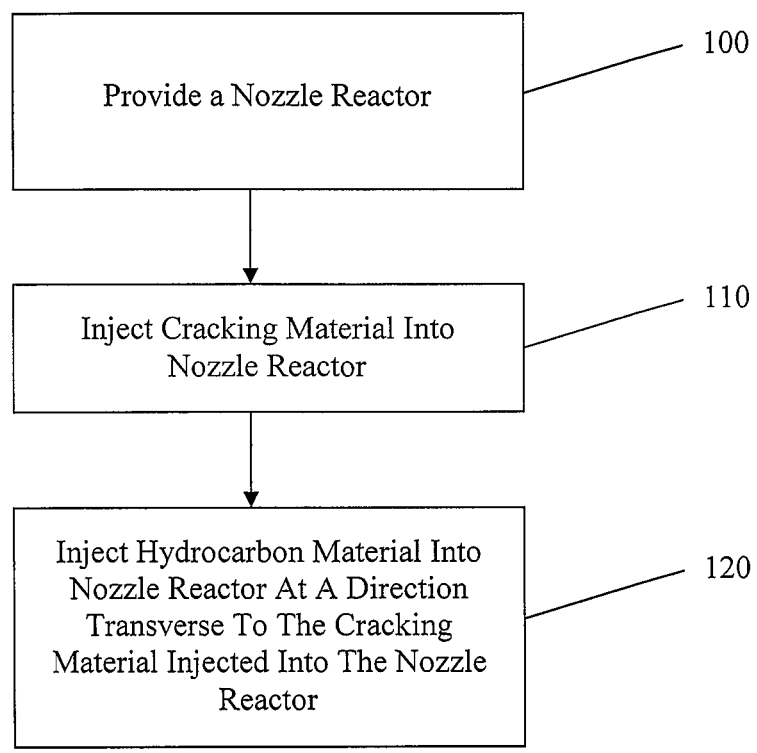
FIG. 1 is a flow diagram of an embodiment of one method described herein.

With reference to FIG. 1, a method for cracking hydrocarbon material generally includes a step 100 of providing a nozzle reactor, a step 110 of injecting cracking material into the nozzle reactor, and a step 120 of injecting hydrocarbon material into the nozzle reactor at a direction transverse to the direction that cracking material is injected into the nozzle reactor. The cracking material can be selected from methanol, ethanol, ethane, propane, carbon monoxide, biodiesel, nitrogen, or any combinations thereof. In utilizing these materials as the cracking material, the method avoids or reduces the use of steam as cracking material and the shortcomings associated therewith.

Figure 2:
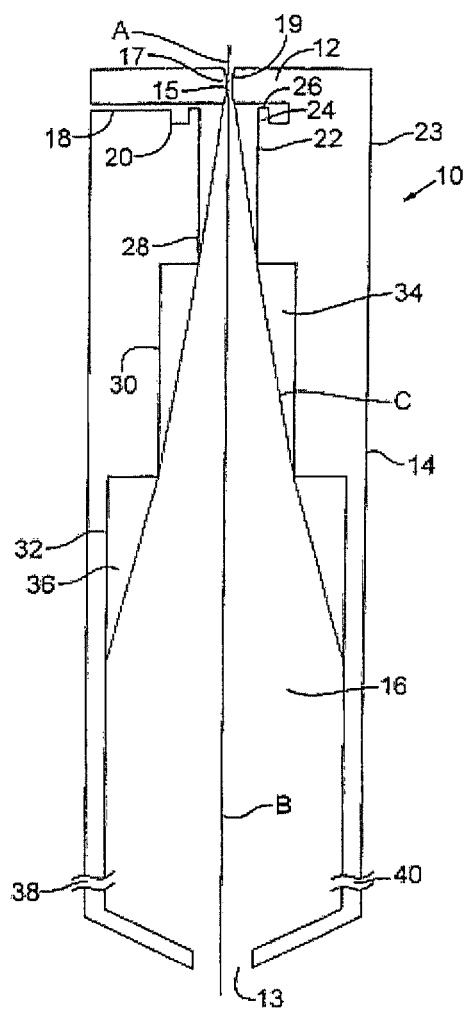
FIG. 2 is a cross-sectional, schematic view of one embodiment of a nozzle reactor.

The method includes a step 100 of providing a nozzle reactor. As described above, some nozzle reactors are generally used to cause interactions between materials and achieve alteration of the mechanical or chemical composition of one or more of the materials. With reference to FIG. 2, a nozzle reactor suitable for use in the method described herein and indicated generally at 10 includes a reactor body injection end 12, a reactor body 14 extending from the reactor body injection end 12, and an ejection port 13 in the reactor body 14 opposite its injection end 12. The reactor body injection end 12 includes an injection passage 15 extending into the interior reactor chamber 16 of the reactor body 14. The central axis A of the injection passage 15 can be coaxial with the central axis B of the interior reactor chamber 16.

With continuing reference to FIG. 2, the injection passage 15 can have a circular diametric cross-section and, as shown in the axially-extending cross-sectional view of FIG. 2, opposing inwardly curved side wall portions 17, 19 (i.e., curved inwardly toward the central axis A of the injection passage 15) extending along the axial length of the injection passage 15. In certain embodiments, the axially inwardly curved side wall portions 17, 19 of the injection passage 15 allow for a higher speed of cracking material when passing through the injection passage 15 into the interior reactor chamber 16.

In certain embodiments, the side wall of the injection passage 15 provide one or more among: (i) uniform axial acceleration of cracking material passing through the injection passage; (ii) minimal radial acceleration of such cracking material; (iii) a smooth finish; (iv) absence of sharp edges; and (v) absence of sudden or sharp changes in direction. The side wall configuration can render the injection passage 15 substantially isentropic.

A material feed passage 18 extends from the exterior of the reactor body 14 toward the interior reactor chamber 16. In the embodiment shown in FIG. 2, the material feed passage 18 is aligned transversely to the axis A of the injection passage 15, although other configurations can be used. The material feed passage 18 penetrates an annular material feed port 20 adjacent the interior reactor chamber wall 22 at the interior reactor chamber injection end 24 abutting the reactor body injection end 12. The material feed port 20 includes an annular, radially extending reactor chamber feed slot 26 in material-injecting communication with the interior reactor chamber 16. The material feed port 20 can thus be configured to inject feed material: (i) around the entire circumference of a cracking material injected through the injection passage 15; and (ii) to impact the entire circumference of the free cracking material stream virtually immediately upon its emission from the injection passage 15 into the interior reactor chamber 16. As noted above, the material feed port 20 can also inject feed material at about a 90° angle to the axis of travel of cracking material injected from the injection passage 15, although other angles greater than or less than 90° may also be used.

The annular material feed port 20 can have a U-shaped or C-shaped cross-section among others. In certain embodiments, the annular material feed port 20 is open to the interior reactor chamber 16, with no arms or barriers in the path of fluid flow from the material feed passage 18 toward the interior reactor chamber 16. The junction of the annular material feed port 20 and material feed passage 18 can have a radiused cross-section.

In alternative embodiments, the material feed passage 18, annular material feed port 20, and/or injection passage 15 have differing orientations and configurations, and there can be more than one material feed passage and associated structure. Similarly, in certain embodiments the injection passage 15 is located on or in the interior reactor chamber side 23 (and if desired may include an annular cracking material port) rather than at the reactor body injection end 12 of the reactor body 14, and the annular material feed port 20 can be non-annular and located at the reactor body injection end 12 of the reactor body 14.

In the embodiment illustrated in FIG. 2, the interior reactor chamber 16 is bounded by stepped, telescoping side walls 28, 30, 32 extending along the axial length of the reactor body 14. In certain embodiments, the stepped side walls 28, 30, 32 are configured to: (i) allow a free jet of injected cracking material to travel generally along and within the conical jet path C generated by the injection passage 15 along the axis B of the interior reactor chamber 16, while (ii) reducing the size or involvement of back flow areas, e.g., 34, 36, outside the conical or expanding jet path C, thereby forcing increased contact between the high speed cracking material jet stream within the conical jet path C and feed material, such as hydrocarbon material, injected through the annular material feed port 20.

As indicated by the drawing gaps 38, 40 in the embodiment shown in FIG. 2, the reactor body 14 has an axial length (along axis B) that is much greater than its width. In the FIG. 2 embodiment, exemplary length-to-width ratios are typically in the range of 2 to 4 or more.

The dimensions of the various components of the nozzle reactor shown in FIG. 2 are not limited, and may generally be adjusted based on the amount of hydrocarbon material to be cracked inside the nozzle reactor. Table 1 provides exemplary dimensions for the various components of the nozzle reactor based on the hydrocarbon material input in barrels per day (BPD). The dimensions provided in Table 1 are not exhaustive for the given hydrocarbon input rate, as other dimensions may be used for hydrocarbon inputs of 5,000 BPD, 10,000 BPD and 20,000 BPD.

TABLE 1

| Nozzle Reactor Component (mm) | Hydrocarbon Input, 000' kg (BPD) | | |
|---|---|---|---|
| | 790 (5,000) | 1,580 (10,000) | 3,160 (20,000) |
| Injection Passage, Enlarged Volume Injection Section Diameter | 148 | 207 | 295 |
| Injection Passage, Reduced Volume Mid-Section Diameter | 50 | 70 | 101 |
| Injection Passage, Enlarged Volume Ejection Section Diameter | 105 | 147 | 210 |
| Injection Passage Length | 600 | 840 | 1,200 |
| Interior Reactor Chamber Injection End Diameter | 187 | 262 | 375 |
| Interior Reactor Chamber Ejection End Diameter | 1,231 | 1,435 | 1,821 |
| Interior Reactor Chamber Length | 6,400 | 7,160 | 8,800 |
| Overall Nozzle Reactor Length | 7,000 | 8,000 | 10,000 |
| Overall Nozzle Reactor Outside Diameter | 1,300 | 1,600 | 2,000 |

As can be seen from Table 1, the injection passage can be small relative to the reactor body. The relatively small size of the injection passage is beneficial in that the injection passage can be part of a replaceable insert that is easily removed from the reactor body. Accordingly, other injection passages having different internal dimensions and providing different types of injection flow properties for the cracking material may be used to increase the versatility of the nozzle reactor as a whole.

Figure 3:
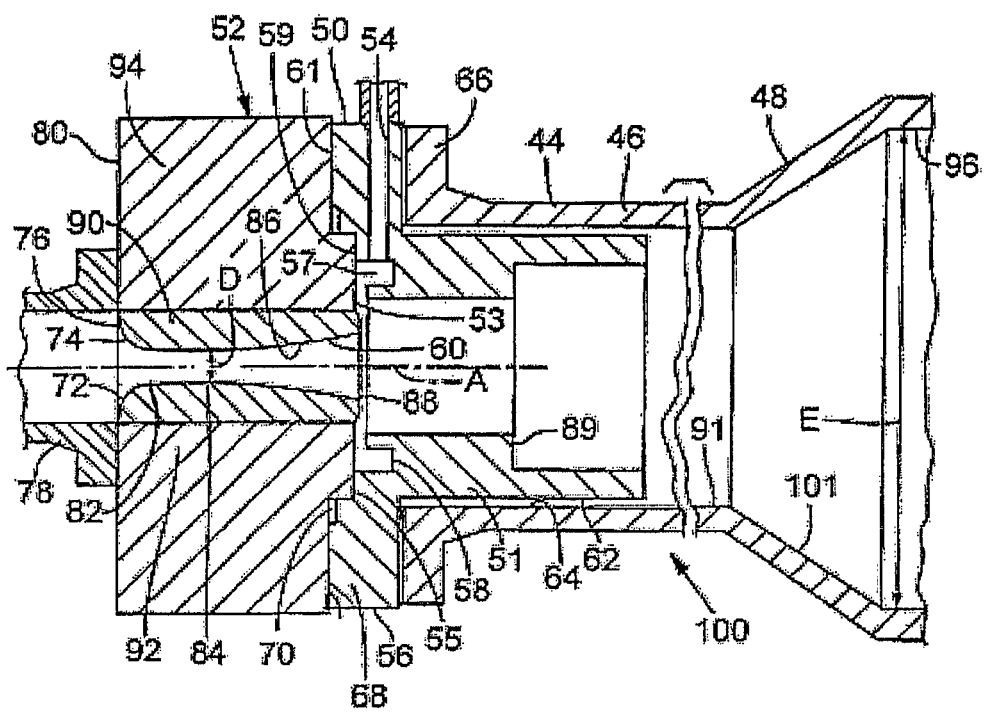
FIG. 3 is a cross-sectional view of the nozzle reactor of FIG. 1, showing further construction details for the nozzle reactor.

With reference now to FIG. 3 and the particular embodiment shown therein, the reactor body 44 includes a generally tubular central section 46 and a frustoconical ejection end 48 extending from the central section 46 opposite an insert end 50 of the central section 46, with the insert end 50 in turn abutting the injection nozzle 52. The insert end 50 of the central section 46 can consist of a generally tubular central body 51. The central body 51 can have a tubular material feed passage 54 extending from the external periphery 56 of the insert end 50 radially inwardly to injectingly communicate with the annular circumferential feed port depression or channel 58 in the otherwise planar, radially inwardly extending portion 59 of the axially stepped face 61 of the insert end 50. The inwardly extending portion 59 can abut the planar radially internally extending portion 53 of a matingly stepped face 55 of the injection nozzle 52. The feed port channel 58 and axially opposed radially internally extending portion 53 of the injection nozzle 52 can cooperatively provide an annular feed port 57 disposed generally radially outwardly from the axis A of a preferably non-linear injection passage 60 in the injection nozzle 52.

The tubular body 51 of the insert end 50 can be secured within and adjacent to the interior periphery 64 of the reactor body 44. The mechanism for securing the insert end 50 in this position can consist of an axially-extending nut-and-bolt arrangement (not shown) penetrating co-linearly mating passages (not shown) in: (i) an upper radially extending lip 66 on the reactor body 44; (ii) an abutting, radially outwardly extending thickened neck section 68 on the insert end 50; and (iii) in turn, the abutting injector nozzle 52. Other mechanisms for securing the insert end 50 within the reactor body 44 include a press fit (not shown) or mating threads (not shown) on the outer periphery 62 of the tubular body 51 and on the inner periphery 64 of the reactor body 44. Seals, e.g., 70, can be mounted as desired between, for example, the radially extending lip 66 and the abutting the neck section 68 and the neck section 68 and the abutting injector nozzle 52.

The non-linear injection passage 60 can have, from an axially-extending cross-sectional perspective, mating, radially inwardly curved opposing side wall sections 72, 74 extending along the axial length of the non-linear injection passage 60. The entry end 76 of injection passage 60 provides a rounded circumferential face abutting an injection feed tube 78, which can be bolted (not shown) to the mating planar, radially outwardly extending distal face 80 on the injection nozzle 52.

In the embodiment shown in FIG. 3, the injection passage 60 is a DeLaval type of nozzle and have an axially convergent section 82 abutting an intermediate relatively narrower throat section 84, which in turn abuts an axially divergent section 86. The injection passage 60 can also have a circular diametric cross-section (i.e., in cross-sectional view perpendicular to the axis of the nozzle passage) all along its axial length. In certain embodiments, the injection passage 60 also presents a somewhat roundly curved thick 82, less curved thicker 84, and relatively even less curved and more gently sloped relatively thin 86 axially extending cross-sectional configuration from the entry end 76 to the injection end 88 of the injection passage 60 in the injection nozzle 52.

The injection passage 60 can thus be configured to present a substantially isentropic or frictionless configuration for the injection nozzle 52. This configuration may vary, however, depending on the application involved in order to yield a substantially isentropic configuration for the application.

The injection passage 60 can be formed in a replaceable injection nozzle insert 90 press-fit or threaded into a mating injection nozzle mounting passage 92 extending axially through an injection nozzle body 94 of the injection nozzle 52. The injection nozzle insert 90 can preferably be made of hardened steel alloy, and the balance of the nozzle reactor 100 components other than seals, if any, may preferably be made of steel or stainless steel.

In the particular embodiment shown in FIG. 1, the diameter D within the injection passage 60 is 140 mm. The diameter E of the ejection passage opening 96 in the ejection end 48 of the reactor body 44 is 2.2 meters. The axial length of the reactor body 44, from the injection end 88 of the injector passage 60 to the ejection passage opening 96, is 10 meters. These dimensions are not exhaustive, as other dimensions may be used.

The interior peripheries 89, 91 of the insert end 50 and the tubular central section 46, respectively, can cooperatively provide a stepped or telescoped structure expanding radially outwardly from the injection end 88 of the injection passage 60 toward the frustoconical end 48 of the reactor body 44. The particular dimensions of the various components, however, will vary based on the particular application for the nozzle reactor, generally 100. Factors taken into account in determining the particular dimensions include the physical properties of the cracking gas (density, enthalpy, entropy, heat capacity, etc.) and the pressure ratio from the entry end 76 to the injection end 88 of the injection passage 60.

Other embodiments of nozzle reactors suitable for use in the method described herein are set forth in commonly owned, co-pending U.S. application Ser. No. 12/245,036, which is hereby incorporated by reference.

The nozzle reactor provided at step 100 can be used to crack hydrocarbon material into lighter hydrocarbons and other components. In order to do so in certain embodiments, a cracking material and a hydrocarbon material are injected into the nozzle reactor. The collision of the injected hydrocarbon material with the high speed and high temperature cracking material can deliver kinetic and/or thermal energy to the hydrocarbon material and result in the cracking of hydrocarbons. The applicants believe that this process may continue, but with diminished intensity and productivity, through the length of the reactor body 44 as injected hydrocarbon material is forced along the axis of the reactor body 44 and yet constrained from avoiding contact with the cracking material jet stream by the telescoping interior walls, e.g., 89, 91 101, of the reactor body 44.

In view of the above described mechanism for cracking hydrocarbon material inside a nozzle reactor, the method includes a step 110 of injecting cracking material into the nozzle reactor and a step 120 of injecting hydrocarbon material into the nozzle reactor at a direction transverse to the cracking material entering the nozzle reactor.

Referring first to step 110 and with reference to FIG. 2, the cracking material is injected into the interior reactor chamber 16 of the nozzle reactor via the injection passage 15. The configuration of the injection passage 15 provides for the acceleration of the cracking material as it passes through the injection passage 15. With reference to FIG. 3, the pressure differential from the entry end 76 of the injection passage 60, where the pressure is relatively high, to the ejection end 88 of the injection passage 60, where the pressure is relatively low, aids in accelerating the cracking material through the injection passage 60. In certain embodiments having one or more non-linear cracking material injection passages 60, the pressure differential yields a steady increase in the kinetic energy of the cracking material as it moves along the length of the cracking material injection passage(s) 60. The cracking material thereby ejects from the ejection end 88 of the injection passage 60 into the interior of the reactor body 44 at supersonic speed with a commensurately relatively high level of kinetic energy.

Other embodiments of a cracking material injection passage may not be as isentropic but provide a substantial increase in the speed and kinetic energy of the cracking material as it moves through the injection passage 60. For example, an injection passage 60 may comprise a series of conical or toroidal sections (not shown) to provide varying cracking material acceleration through the injection passage 60 and, in certain embodiments, supersonic discharge of the cracking material from the passage 60.

The cracking material injected into the nozzle reactor at step 110 can be any suitable material for cracking hydrocarbon. In some embodiments, the cracking material is selected from methanol, ethanol, ethane, propane, nitrogen, carbon monoxide, biodiesel, or combinations thereof. Prior to injection, these cracking materials can be in the form of a gas, a liquid, or in some embodiments, a combination of both. However, once injected into the reactor body of the nozzle reactor, the cracking material is in the form of a gas.

Any of the cracking materials described above that enter the injection passage can be heated prior to being injected into the injection passage. In some embodiments, the cracking material is pre-heated to a temperature in the range of from about 200° C. to about 450° C.

Any of the cracking materials described above can also be pressurized prior to being injected into the injection passage. In some embodiments, the pressure of the cracking material prior to injection into the injection passage ranges from about 5 bar to about 100 bar. Additionally, the pressure at the ejection end of the injection passage (e.g., inside the reactor chamber) can be adjusted. In some embodiments, the pressure at the ejection end of the injection passage is less than 15 bar.

Manipulating the pressure of the cracking material prior to injection into the injection passage and the pressure at the ejection end of the injection passage as described above can assist in creating the pressure differential between the entry end and the ejection end of the injection passage that causes the cracking material necessary to accelerate the cracking material to supersonic speeds. The velocity of the cracking material as it exits the injection passage can range from about Mach 1 to about Mach 5.

The amount of cracking material introduced into the injection passage can be any suitable amount and can vary over a wide range or flow rates. In some embodiments, the amount of cracking material introduced into the injection passage is adjusted based on the amount of hydrocarbon material simultaneously injected into the nozzle reactor as described in greater detail below. In some embodiments, the amount of cracking material introduced into the injection passage ranges from about 0.25 to about 4.0 times the amount of hydrocarbon material injected into the nozzle reactor.

In some embodiments, use of the above described cracking materials requires that the nozzle reactor be operated in an oxygen free environment. The absence of oxygen can help to prevent the auto-ignition of these materials, which in some cases, occurs at temperatures within the operating conditions of the nozzle reactor. The absence of oxygen can generally limit or eliminate the formation of radicals. For example, in the case of alkanes such as propane, the presence of oxygen may break down into hydroxyl radicals, and such hydroxyl radicals may interact with the alkanes to produce radicals.

In some embodiments, any of the cracking materials discussed above are injected into the nozzle reactor together with an additional material. The additional material can be any material that is capable of producing ionic species that can satisfy the radical position created by the breaking of C—C bonds in the hydrocarbon material inside the nozzle reactor. Exemplary additional materials include, but are not limited to, steam, methanol, methane, ethane, propane, pentane, hexane, and heptane. The additional material can also be a material that disassociates under the nozzle reactor operating conditions. As with the cracking material, the additional material can be a gas, a liquid, or a combination of both, but once injected into the reactor body of the nozzle reactor, the additional material is in the form of a gas.

The additional material can be mixed with the cracking material prior to injection into the nozzle reactor. Alternatively, the cracking material and the additional material are injected into the nozzle reactor at the same time. Any suitable amount of additional material can be used with the cracking material. In some embodiments, the amount of additional material injected into the nozzle reactor is from about 0.1% to about 10% of the total cracking material mass.

Referring now to step 120, hydrocarbon material is also injected into the nozzle reactor. In some embodiments, the hydrocarbon material is injected into the interior reactor chamber 16 of the nozzle reactor via the material feed passage 18. With reference to FIG. 3, the material feed passage 54 is oriented in a direction perpendicular to the injection passage 60. In this configuration, the hydrocarbon material thereby travels radially inwardly to impact a transversely (i.e., axially) traveling high speed cracking material virtually immediately upon its ejection from the ejection end 88 of the injection passage 60.

The type of hydrocarbon material injected into the nozzle reactor at step 120 can be any suitable hydrocarbon material for cracking. In some embodiments, the hydrocarbon material includes bitumen or a bitumen residue (i.e., the fractions of the bitumen having the highest molecular weight). The hydrocarbon material can also include asphaltene. The hydrocarbon material can also be any mixture of materials that includes various types of hydrocarbons and other materials. In some embodiments, the hydrocarbon material is hydrocarbon material collected from a refinery processing operation. For example, the hydrocarbon material may be residual oil produced by any type of refinery processing operation, such as distillation, coking, hydrocracking, hydrotreating, and deasphalting. Residual oil is described in greater detail in commonly owned, co-pending U.S. Provisional Application No. 61/169,569, herein incorporated by reference.

In some embodiments, the hydrocarbon material injected into the nozzle reactor at step 120 is pretreated prior to injection. In some embodiments, the hydrocarbon material is preheated. In some embodiments, the preheat provides an injection temperature of from about 300° C. to about 450° C., and more preferably, from about 390° C. to about 430° C. Preheating can take place at a pressure similar or identical to the pressure inside of the nozzle reactor. In some embodiments, the pre-heating therefore takes place at a range of from about 2 bar to about 15 bar (which is generally the same pressure as that in the reactor body 44).

The amount of hydrocarbon material injected into the nozzle reactor can be any suitable amount of hydrocarbon that can be received by the nozzle reactor. In some embodiments, the amount of hydrocarbon material injected into the nozzle reactor depends on the size of the nozzle reactor.

In some embodiments, the amount of hydrocarbon material injected into the nozzle reactor determines the amount of cracking material injected into the nozzle reactor. In some embodiments, the amount of cracking material injected in the nozzle reactor is from about 0.25 to about 4.0 times the amount of hydrocarbon material injected into the nozzle reactor.

The retention time of the hydrocarbon material in the reactor body zone is relatively short. In some embodiments, the retention time is in the range of from about 0.1 seconds to about 30 seconds. For example, the retention time of the hydrocarbon material in the reactor body can be about 1.0 seconds.

It is generally theorized that nozzle reactors as described herein preferentially crack molecules having the largest molecular mass over molecules having smaller molecular mass. This may be due in part to the higher boiling point temperature of the larger hydrocarbon molecules. The larger hydrocarbon molecules more likely to be in a liquid state upon injection into the nozzle reactor due to the higher boiling point temperatures, and consequently, are more likely to be cracked by, e.g., the shockwaves produced by injecting the cracking material into the nozzle reactor at a supersonic speed. Conversely, the molecules having a smaller molecular mass may be present in the nozzle reactor in a gaseous state, thus making it less likely that the shockwaves will crack the molecules. In some embodiments, the smaller molecules may pass through the nozzle reactor unaltered.

Table 2 shows the approximate percent gain or loss of various hydrocarbon components of a hydrocarbon material subjected to nozzle reactor treatment as described herein.

TABLE 2

| Hydrocarbon Molecule | Percent Change |
|---|---|
| $C_7$ Insoluble Asphaltene | Loss >>75% |
| $C_5$ Insoluble Asphaltene | Loss >50% |
| Resins | Loss >50% |
| Aromatics | Gain >50% |
| Saturates | Gain >20% |

As can be seen from Table 2, the largest hydrocarbon molecules ($C_7$ insoluble asphaltene) of the hydrocarbon material were lost at the greatest rate. These molecules may have been lost due to the cracking of the large hydrocarbon molecules into smaller aromatics and saturates. This may also explain the increase in the amount of aromatics and saturates after the hydrocarbon material has been passed through the nozzle reactor.

Ultimately, the material exiting the nozzle reactor can be a combination of cracked and un-cracked hydrocarbon molecules. As noted above, the un-cracked material can include some of the smaller hydrocarbon molecules that passed through the nozzle reactor un-cracked. However, the un-cracked material may also include larger hydrocarbon materials that were not cracked in the nozzle reactor, possibly as a result of the short residence time of the hydrocarbon material in the reactor body.

Any variety of additional processing steps can be performed on the hydrocarbon material exiting the nozzle reactor. The hydrocarbon material that has been cracked to a suitable extent can be sold as commercial product or can undergo further upgrading in a refinery operation. Hydrocarbon material that has not been sufficiently cracked can be processed in additional cracking apparatus, including recycling the hydrocarbon material back through the nozzle reactor as discussed in greater detail in co-pending U.S. application Ser. No. 12/579,193, herein incorporated by reference.

In addition to cracked and un-cracked hydrocarbons, cracking material can also exit the nozzle reactor. Any cracking material exiting the nozzle reactor can be collected for reuse in the method described herein or for use in other processes. The pressure of the cracking material may have reduced between the injection of the cracking material into the nozzle reactor and the exiting of the cracking material from the nozzle reactor. In such cases, the cracking material can be repressurized after it has been collected so that it can be reused in the method described herein. Similarly, the temperature of the cracking material may have decreased and therefore the collected cracking material can be heated prior to being recycled back to the nozzle reactor.

EXAMPLES

Example 1

A nozzle reactor as illustrated in FIGS. 2 and 3 and described in greater detail above is provided. The dimensions of various components of the nozzle reactor are provided in Table 3 below.

TABLE 3

| Nozzle Reactor Component | Size (mm) |
|---|---|
| Injection Passage, Enlarged Volume Injection Section Diameter | 3.0 |
| Injection Passage, Reduced Volume Mid-Section Diameter | 1.3 |
| Injection Passage, Enlarged Volume Ejection Section Diameter | 2.1 |
| Injection Passage Length | 12 |
| Interior Reactor Chamber Injection End Diameter | 3.7 |
| Interior Reactor Chamber Ejection End Diameter | 24.6 |
| Interior Reactor Chamber Length | 128 |
| Overall Nozzle Reactor Length | 140 |
| Overall Nozzle Reactor Outside Diameter | 260 |

In this example, the cracking material entering the reaction chamber of the nozzle reactor is a combination of steam and gaseous methanol. The combination of steam and gaseous methanol is prepared by adding liquid methanol to water fed into a boiler and feeding the combination into the injection passage. Prior to feeding the combination into the injection passage, the combination is heated to a temperature of 600° C. and a pressure of 40 bar. The combination includes 5% methanol, such that when a flow rate of 100 grams per hour of the cracking material is injected into the nozzle reactor through the injection passage, gaseous methanol is injected into the nozzle reactor at a rate of 5 grams per hour and steam is injected into the nozzle reactor at a rate of 95 grams per hour. For this example, no hydrocarbon material is injected into the nozzle reactor. The material exiting the ejection end of the nozzle reactor has a composition as set forth in the Table 4 below (based on condensation and removal of steam as water):

TABLE 4

| Components | Methanol Mol - % |
|---|---|
| Hydrogen | 69.2 |
| $CO_2$ | 16.3 |
| $H_2S$ | <0.05 |
| Oxygen | 0.15 |

TABLE 4-continued

| Components | Methanol Mol - % |
|---|---|
| Nitrogen | 0.69 |
| CO | 13.4 |
| $CH_4$ | 0.16 |
| Ethane | <0.05 |
| Ethylene | <0.05 |
| Propane | <0.05 |
| Propylene | <0.05 |
| Butene | <0.05 |
| Methyl Acetylene | <0.05 |
| Pentane | <0.05 |
| $C_{6+}$ | 0.04 |
| Total | 99.9 |

Example 2

Example 1 is repeated with the exception that ethanol is used in place of methanol. The material exiting the ejection end of the nozzle reactor has a composition as set forth in Table 5 below (based on condensation and removal of steam as water):

TABLE 5

| Component | Ethanol Mol - % |
|---|---|
| Hydrogen | 42.9 |
| $CO_2$ | 15.9 |
| $H_2S$ | <0.05 |
| Oxygen | 0.02 |
| Nitrogen | 0.12 |
| CO | 16.1 |
| $CH_4$ | 22.1 |
| Ethane | 0.91 |
| Ethylene | 1.72 |
| Propane | <0.05 |
| Propylene | <0.05 |
| Butene | <0.05 |
| Methyl Acetylene | <0.05 |
| Pentane | <0.05 |
| $C_{6+}$ | 0.22 |
| Total | 100.0 |

Example 3

Example 1 is repeated, with the exception that a hydrocarbon is introduced into the nozzle reactor at the same time as the cracking material in order to attempt to upgrade the hydrocarbon material.

More specifically, bitumen residue obtained from the processing of Cold Lake bitumen through the nozzle reactor is injected into the nozzle reactor through the material feed passage. The composition of the bitumen used is summarized in the column labeled "FEED" in Table 6 below:

TABLE 6

| | FEED | Product Pitch | Distillates |
|---|---|---|---|
| Chemical and Physical Assays | | | |
| Sulfur, wt-% | 6.7 | 6.7 | 3.3 |
| Micro Carbon, wt-% | 27.9 | 42.0 | 5.6 |
| Carbon, wt-% | 82.5 | 83.2 | 81.1 |
| Hydrogen, wt-% | 9.5 | 9.0 | 10.7 |

TABLE 6-continued

| | FEED | Product Pitch | Distillates |
|---|---|---|---|
| Nitrogen, ppm | 5970 | 6260 | 2230 |
| Vanadium, ppm | 350 | 576 | 50 |
| Nickel, ppm | 134 | 225 | 14.3 |
| Titanium, ppm | 3.1 | 4.2 | <1 |
| Iron, ppm | 75 | 96 | <1 |
| Asphaltene, C7 soluble | 25.7 | 41.4 | <1 |
| TAN, mg KOH/g | 0.65 | 0.50 | 0.70 |
| Specific Gravity, g/cc | 1.05 | 1.11 | 0.98 |
| API | 3.3 | −3.7 | 12.9 |
| SARA | | | |
| Saturates, wt-% | 13.2 | 12.9 | 31.3 |
| Aromatics, wt-% | 28.4 | 19.2 | 58.8 |
| Resins, wt-% | 17.6 | 16.4 | 7.70 |
| Asphaltene, wt-% | 40.8 | 51.6 | 2.20 |

The bitumen residue is injected into the nozzle reactor at a rate of 100 grams per minute. The temperature of the bitumen residue prior to injection was 400° C. The bitumen residue is injected into the nozzle reactor at a direction transverse to the direction that the cracking material is injected into the nozzle reactor. The average nozzle reactor operating temperature is 445° C. and the weight ratio of cracking material to bitumen residue is maintained at 2.0. The gas phase of the material exiting the ejection end of the nozzle reactor has a composition as set forth in Table 7 below (based on condensation and removal of steam as water):

TABLE 7

| Component | Methanol Plus Residue Mol - % |
|---|---|
| Hydrogen | 55.2 |
| $CO_2$ | 13.4 |
| $H_2S$ | 0.36 |
| Oxygen | 0.00 |
| Nitrogen | 0.36 |
| CO | 8.21 |
| $CH_4$ | 1.97 |
| Ethane | 0.68 |
| Ethylene | 0.18 |
| Propane | 0.49 |
| Propylene | 0.35 |
| Butene | 0.49 |
| Methyl Acetylene | 0.12 |
| Pentane | 0.14 |
| $C_{6+}$ | 17.75 |
| Total | 99.7 |

Excluding the steam phase, about 11% of the total nozzle discharge represents the gas phase as shown in Table 7. A liquid pitch phase (50%) and a liquid distillate phase (39%) make up the 89% of the nozzle discharge that was in a liquid phase.

As can be calculated from Table 6, the molar hydrogen to carbon ratio for the feed material is 1.38. When combining all products in the liquid phase, the hydrogen to carbon ratio for the combined product amounts to 1.4. Since there is a substantial amount of gas being produced and no coke, this demonstrates that upon cracking the heavy hydrocarbon molecules, some hydrogen is taken up into the product structure, given the fact that a large amount of pure hydrogen is available as shown in the off gas analysis (Table 7). The source of the hydrogen is likely either the methanol in the feed, the steam phase, or a combination of both.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A method comprising:
  providing a nozzle reactor, the nozzle reactor comprising:
    a reactor body having a reactor body passage with an injection end and an ejection end;
    a first material injector having a first material injection passage and being mounted in the nozzle reactor in material injecting communication with the injection end of the reactor body, the first material injection passage having (a) an enlarged volume injection section, an enlarged volume ejection section, and a reduced volume mid-section intermediate the enlarged volume injection section and enlarged volume ejection section, (b) a material injection end, and (c) a material ejection end in injecting communication with the reactor body passage; and
    a second material feed port penetrating the reactor body and being adjacent to the material ejection end of the first material injection passage;
  injecting a stream of cracking material through the first material injector into the reactor body; and
  injecting hydrocarbon material through the second material feed port into the reactor body;
  wherein the cracking material comprises from 90 to 99.9% methanol, ethanol, ethane, propane, biodiesel, carbon monoxide, or nitrogen.

2. The method as recited in claim 1, wherein the second material feed port is aligned transverse to a first material injection passage axis extending from the material injection end and material ejection end in the first material injection passage in the first, and wherein the hydrocarbon material is injected through the second material feed port into the reactor body in a direction transverse to the stream of cracking material entering the reactor body from the first material injector.

3. The method as recited in claim 1, wherein the cracking material is a gas prior to injection through the first material injector.

4. The method as recited in claim 1, wherein the cracking material is a liquid prior to injection through the first material injector.

5. The method as recited in claim 1, wherein the cracking material further comprises an additional material, the additional material comprising steam.

6. The method as recited in claim 1, wherein the hydrocarbon material comprises bitumen.

7. The method as recited in claim 1, wherein the hydrocarbon material comprises bitumen residue.

8. The method as recited in claim 1, wherein the enlarged volume injection section includes a converging central passage section, and the reduced volume mid-section and the enlarged volume ejection section include a diverging central passage section.

9. The method as recited in claim 8, wherein the converging central passage section, the reduced volume mid-section, and the diverging central passage section cooperatively provide a radially inwardly curved passage side wall intermediate the material injection end and material ejection end of the first material injection passage.

10. The method as recited in claim 1, wherein (a) the reactor body passage has a central rector body axis extending from the injection end to the ejection end of the reactor body passage and (b) the central reactor body axis is coaxial with a first material injection passage axis.

11. The method as recited in claim 1, wherein the enlarged volume injection section, reduced volume mid-section, and enlarged volume ejection section in the first material injection passage cooperatively provide a substantially isentropic passage for the stream of cracking material through the first material injection passage.

12. The method as recited in claim 1, wherein the second material feed port is annular.

13. The method as recited in claim 1, wherein the reactor body passage has a varying cross-sectional area and wherein the cross-sectional area of the reactor body passage either maintains constant or increases between the injection end and the ejection end of the reactor body passage.

14. The method as recited in claim 9, wherein the radially inwardly curved side wall in the first material injection passage is adapted to provide a substantially isentropic passage of the cracking material through the first material injector.

15. The method as recited in claim 1, wherein the cracking material is accelerated to supersonic speed by the first material injection passage of the first material injector.

16. The method as recited in claim 1, wherein injecting the hydrocarbon material into the reactor body includes injecting the hydrocarbon material into the reactor body annularly around the stream of cracking material.

17. The method as recited in claim 1, wherein the cracking material comprises from 90 to 99.9% methanol, ethanol, biodiesel, or carbon monoxide.

18. A method comprising:
  injecting a stream of cracking material through a cracking material injector into a reaction chamber, wherein the cracking material comprises 90 to 99.9% methanol, ethanol, ethane, propane, biodiesel, carbon monoxide, or nitrogen; and
  injecting hydrocarbon material into the reaction chamber adjacent to the cracking material injector.

19. The method as recited in claim 18, wherein the hydrocarbon material is injected into the reaction chamber in a direction transverse to the stream of cracking material entering the reaction chamber from the cracking material injector.

20. The method as recited in claim 18, wherein the cracking material is a gas prior to injection through the cracking material injector.

21. The method as recited in claim 18, wherein the cracking material is a liquid prior to injection through the cracking material injector.

22. The method as recited in claim 18, wherein the cracking material further comprises an additional material, the additional material comprising steam.

23. The method as recited in claim 18, wherein the cracking material injector includes a converging/diverging passage and injecting a stream of cracking material through a cracking material injector into a reaction chamber includes passing the cracking material through the converging/diverging passage and accelerating the cracking material to supersonic speed within the cracking material injector.

24. The method as recited in claim 19, wherein injecting hydrocarbon material into the reaction chamber adjacent to the cracking material injector and transverse to the stream of cracking material entering the reaction chamber from the cracking material injector includes injecting the hydrocarbon material into the reaction chamber annularly around the pressurized stream of cracking material.

25. The method as recited in claim 18, wherein the cracking material comprises from 90 to 99.9% methanol, ethanol, biodiesel, or carbon monoxide.

* * * * *